United States Patent
Misu et al.

(10) Patent No.: US 11,150,656 B2
(45) Date of Patent: Oct. 19, 2021

(54) AUTONOMOUS VEHICLE DECISION MAKING

(71) Applicant: Honda Motor Co., Ltd., Tokyo (JP)

(72) Inventors: Teruhisa Misu, Mountain View, CA (US); Ashish Tawari, Santa Clara, CA (US); Sujitha Catherine Martin, Sunnyvale, CA (US)

(73) Assignee: Honda Motor Co., Ltd., Tokyo (JP)

( * ) Notice: Subject to any disclaimer, the term of this patent is extended or adjusted under 35 U.S.C. 154(b) by 466 days.

(21) Appl. No.: 16/195,744

(22) Filed: Nov. 19, 2018

(65) Prior Publication Data

US 2020/0159214 A1    May 21, 2020

(51) Int. Cl.
| | |
|---|---|
| *G05D 1/00* | (2006.01) |
| *G05D 1/02* | (2020.01) |
| *G06K 9/62* | (2006.01) |
| *G06K 9/00* | (2006.01) |
| *B60W 50/00* | (2006.01) |

(52) U.S. Cl.
CPC ......... *G05D 1/0088* (2013.01); *G05D 1/0246* (2013.01); *G05D 1/0276* (2013.01); *G06K 9/00791* (2013.01); *G06K 9/00845* (2013.01); *G06K 9/628* (2013.01); *G06K 9/6262* (2013.01); *B60W 50/0097* (2013.01); *G05D 2201/0213* (2013.01)

(58) Field of Classification Search
CPC .. G05D 1/0088; G05D 1/0246; G05D 1/0276; G05D 2201/0213; G06K 9/628; G06K 9/00845; G06K 9/6262; G06K 9/00791; B60W 50/0097; G06N 3/0445; G06N 3/08; G06N 3/0454
See application file for complete search history.

(56) References Cited

U.S. PATENT DOCUMENTS

| | | | |
|---|---|---|---|
| 2003/0039378 A1* | 2/2003 | Yuasa | G06K 9/00805 382/104 |
| 2005/0073136 A1* | 4/2005 | Larsson | A61B 5/163 280/735 |
| 2010/0033333 A1* | 2/2010 | Victor | A61B 5/1114 340/576 |
| 2014/0184550 A1* | 7/2014 | Hennessey | G06F 3/013 345/173 |

\* cited by examiner

*Primary Examiner* — Thomas Ingram
(74) *Attorney, Agent, or Firm* — Rankin, Hill & Clark LLP

(57) ABSTRACT

Systems and techniques for autonomous vehicle decision making may include training an autonomous vehicle decision making database by capturing an image including a first training object and a second training object during a training phase. The first training object may be classified as a first class and the second training object may be classified as a second class based on a driver gaze location associated with a driver of the vehicle. The database may be built based on classification of the first training object and the second training object. The autonomous vehicle decision making database may be utilized to classify a first object as a first class and a second object as a second class during an operation phase. A processor may perform a first computation associated with the first object based on the classification of the first object and the classification of the second object.

20 Claims, 7 Drawing Sheets class 1
deep computation class 2
less computation

AUTONOMOUS VEHICLE DECISION MAKING

BACKGROUND

Generally, autonomous vehicles may utilize continuous sensor data from sensors to facilitate operation through an operating environment, which may include traffic on roadways, pedestrians, obstructions, etc. Autonomous vehicles may be equipped with a variety of sensors, including cameras, optic sensors, radar, light detection and ranging sensors, among others. However, processing information from sensors may utilize a great deal of processing power, such as when performed in real-time. In this regard, additional sensors may require additional processor power.

BRIEF DESCRIPTION

According to one aspect, a system for autonomous vehicle decision making may include an image capture device, a driver gaze capture device, and a processor. The image capture device may capture an image of an operating environment through which a vehicle is travelling. The image may include a first training object and a second training object. The driver gaze capture device may capture a driver gaze location associated with a driver of the vehicle. The processor may extract the first training object and the second training object from the image of the operating environment, classify the first training object as a first class and classifying the second training object as a second class based on the driver gaze location associated with the driver of the vehicle, and build an autonomous vehicle decision making database based on the classification of the first training object and the classification of the second training object.

The processor may classify the first training object as the first class and classifies the second training object as the second class based on a vehicle operation input received from a controller network area (CAN) bus of the vehicle. The processor may classify the first training object as the first class and classify the second training object as the second class based on deep neural network machine learning. The processor may build the autonomous vehicle decision making database based on deep neural network machine learning.

According to one aspect, a system for autonomous vehicle decision making may include an image capture device and a processor. The image capture device may capture an image of an operating environment through which a vehicle is travelling. The image may include a first object and a second object. The processor may extract the first object and the second object from the image of the operating environment and classify the first object as a first class and classify the second object as a second class based on data from an autonomous vehicle decision making database. The autonomous vehicle decision making database may be trained based on classification of a first training object and classification of a second training object according to a driver gaze location associated with a driver of the vehicle. The processor may perform a first computation associated with the first object based on the classification of the first object and the classification of the second object.

The processor may perform no computation associated with the second object based on the classification of the first object and the classification of the second object. The processor may perform a second computation associated with the second object based on the classification of the first object and the classification of the second object. The second computation associated with the second object may be tracking of the second object. The first computation associated with the first object may be path prediction of the first object.

The image may include a third object, and the processor may extract the third object from the image of the operating environment and classify the third object as a third class based on the autonomous vehicle decision making database. The processor may perform a second computation associated with the second object based on the classification of the first object, the classification of the second object, and the classification of the third object. The processor may perform a third computation associated with the second object based on the classification of the first object, the classification of the second object, and the classification of the third object.

The processor may reclassify the second object as the first class based on data from the autonomous vehicle decision making database and a change associated with the second object. The system for autonomous vehicle decision making may include a communication interface receiving the data associated with the autonomous vehicle decision making database from a server. The system for autonomous vehicle decision making may include a communication interface receiving the image of the image of the operating environment from a mobile device equipped with an image capture sensor.

According to one aspect, a method for autonomous vehicle decision making may include receiving an image of an operating environment through which a vehicle is travelling, wherein the image includes a first object and a second object, extracting the first object and the second object from the image of the operating environment, classifying the first object as a first class, and classifying the second object as a second class based on data from an autonomous vehicle decision making database. The autonomous vehicle decision making database may be trained based on classification of a first training object and classification of a second training object according to a driver gaze location associated with a driver of the vehicle. The method for autonomous vehicle decision making may include performing a first computation associated with the first object based on the classification of the first object and the classification of the second object.

The method for autonomous vehicle decision making may include performing no computation associated with the second object based on the classification of the first object and the classification of the second object. The method for autonomous vehicle decision making may include performing a second computation associated with the second object based on the classification of the first object and the classification of the second object. The second computation associated with the second object may be tracking of the second object. The first computation associated with the first object may be path prediction of the first object. The method for autonomous vehicle decision making may include classifying the second object as the first class based on data from the autonomous vehicle decision making database and a change associated with the second object.

DETAILED DESCRIPTION

Figure 1:
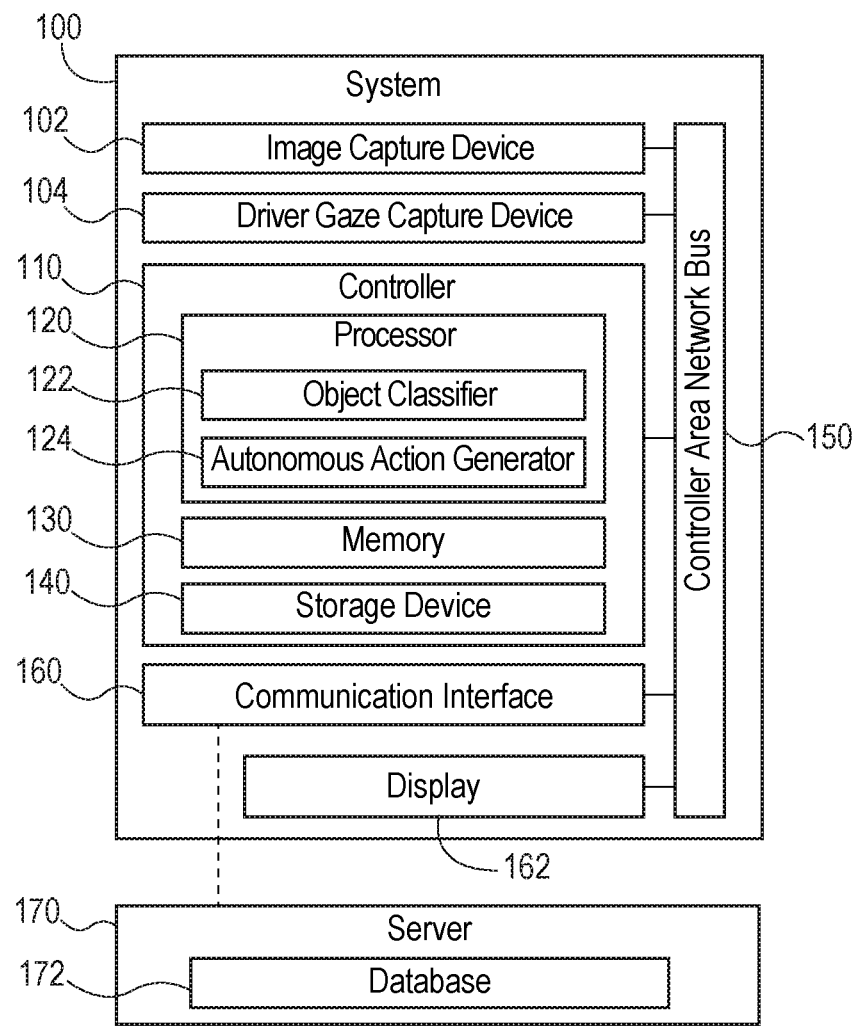
FIG. 1 is an exemplary component diagram of a system for autonomous vehicle decision making, according to one aspect.

The following includes definitions of selected terms employed herein. The definitions include various examples and/or forms of components that fall within the scope of a term and that may be used for implementation. The examples are not intended to be limiting. Further, one having ordinary skill in the art will appreciate that the components discussed herein, may be combined, omitted or organized with other components or organized into different architectures.

A "processor", as used herein, processes signals and performs general computing and arithmetic functions. Signals processed by the processor may include digital signals, data signals, computer instructions, processor instructions, messages, a bit, a bit stream, or other means that may be received, transmitted, and/or detected. Generally, the processor may be a variety of various processors including multiple single and multicore processors and co-processors and other multiple single and multicore processor and co-processor architectures. The processor may include various modules to execute various functions.

A "memory", as used herein, may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

A "disk" or "drive", as used herein, may be a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD-ROM). The disk may store an operating system that controls or allocates resources of a computing device.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

A "database", as used herein, may refer to a table, a set of tables, and a set of data stores (e.g., disks) and/or methods for accessing and/or manipulating those data stores.

An "operable connection", or a connection by which entities are "operably connected", is one in which signals, physical communications, and/or logical communications may be sent and/or received. An operable connection may include a wireless interface, a physical interface, a data interface, and/or an electrical interface.

A "computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others. In this regard, one or more of the components of FIGS. 1-2 may be operably connected with one another and may perform computer communication with one another.

A "mobile device", as used herein, may be a computing device typically having a display screen with a user input (e.g., touch, keyboard) and a processor for computing. Mobile devices include handheld devices, mobile devices, smart phones, laptops, tablets, and e-readers.

A "vehicle", as used herein, refers to any moving vehicle that is capable of carrying one or more human occupants and is powered by any form of energy. The term "vehicle" includes cars, trucks, vans, minivans, SUVs, motorcycles, scooters, boats, personal watercraft, and aircraft. In some scenarios, a motor vehicle includes one or more engines. Further, the term "vehicle" may refer to an electric vehicle (EV) that is powered entirely or partially by one or more electric motors powered by an electric battery. The EV may include battery electric vehicles (BEV) and plug-in hybrid electric vehicles (PHEV). Additionally, the term "vehicle" may refer to an autonomous vehicle and/or self-driving vehicle powered by any form of energy. The autonomous vehicle may or may not carry one or more human occupants.

A "vehicle system", as used herein, may be any automatic or manual systems that may be used to enhance the vehicle, driving, and/or safety. Exemplary vehicle systems include an autonomous driving system, an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system (LKAS), a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, among others.

The aspects discussed herein may be described and implemented in the context of non-transitory computer-readable storage medium storing computer-executable instructions. Non-transitory computer-readable storage media include computer storage media and communication media. For example, flash memory drives, digital versatile discs (DVDs), compact discs (CDs), floppy disks, and tape cassettes. Non-transitory computer-readable storage media may include volatile and non-volatile, removable and non-removable media implemented in any method or technology for storage of information such as computer readable instructions, data structures, modules, or other data.

Training Phase

FIG. 1 is an exemplary component diagram of a system 100 for autonomous vehicle decision making, according to one aspect. The system 100 for autonomous vehicle decision making may include an image capture device 102, a driver gaze capture device 104, and a controller 110. The controller 110 may include a processor 120, which may include an object classifier 122 and an autonomous action generator 124. The controller 110 may include a memory 130 and a storage device 140, such as a disk drive or other storage drive. The system 100 for autonomous vehicle decision making may include a controller area network (CAN) bus 150 communicatively coupling and enabling computer communication between respective components of the system 100 for autonomous vehicle decision making. The system 100 for autonomous vehicle decision making may include a communication interface 160 and a display 162. Additionally, the system 100 for autonomous vehicle decision making may be communicatively coupled with and/or perform computer communication with a server 170, which may include a database, such as an autonomous vehicle decision making database 172.

According to one aspect, the system 100 for autonomous vehicle decision making of FIG. 1 may be utilized during a training phase for autonomous vehicle decision making. In other words, the system 100 for autonomous vehicle decision making of FIG. 1 may be utilized to train the autonomous vehicle decision making database 172 of the server 170. This may be achieved generally by capturing an image including training objects, capturing a driver gaze location and driver gaze location information associated with respective training objects, classifying respective training objects based on the driver gaze location, and building the autonomous vehicle decision making database 172 based thereon.

In greater detail, the image capture device 102 may capture an image of an operating environment through which a vehicle (e.g., a training vehicle) is travelling. During the training phase, an experienced driver or one or more experienced drivers, may be selected for the purpose of training the system 100 for autonomous vehicle decision making and/or the autonomous vehicle decision making database 172. The image captured by the image capture device 102 may include one or more training objects, such as a first training object, a second training object, a third training object, a fourth training object, etc.

According to one aspect, the system 100 for autonomous vehicle decision making of FIG. 1 may implement training in association with the training phase via a simulation. In other words, the display 162 of the system 100 for autonomous vehicle decision making may render the operating environment, which may be simulated via the processor 120.

According to one aspect, the image captured by the image capture device 102 may be of the real world operating environment, rather than a simulated operating environment. Regardless, the training objects of the operating environment may include objects, pedestrians, other vehicles, obstructions, obstacles, debris, potholes, and/or traffic conditions. According to one aspect, the processor 120 may extract or identify one or more of the training objects from the image of the operating environment. For example, the processor 120 may extract or identify the first training object, the second training object, the third training object, etc. from the image of the operating environment based on image processing techniques if the image capture device 102 is utilized when the training phase occurs within the real world operating environment. As a different example, the processor 120 may identify the first training object, the second training object, the third training object, etc. rendered on the display 162 if the training phase is simulated within the simulated operating environment.

The processor 120 may determine, for each one of the training objects, whether the corresponding training object is static or dynamic (e.g., mobile or non-mobile, stationary or moving). The processor 120 may discard or ignore static, non-mobile, non-moving, or stationary training objects, according to one aspect. In this regard, the processor 120 may extract or identify the first training object and the second training object from the image of the operating environment based on a movement status of each training object. Further, the processor 120 may identify whether each training object has the potential to move, even if that training object is currently not moving within a current time window. For example, vehicles with zero occupants may be determined to have an extremely low likelihood of moving, while vehicles stopped at a red light or a stop sign may be considered among the dynamic, mobile, or moving class of training objects.

The driver gaze capture device 104 may capture a driver gaze location associated with a driver of the vehicle. The driver gaze capture device 104 may gather or determine driver gaze information associated with one or more of the training objects or each one of the training objects (e.g., the first training object, the second training object, the third training object, etc.). For example, driver gaze capture device 104 may determine a length of time the driver is focused on a corresponding training object within a given time window. As another example, the driver gaze capture device 104 may determine whether an object is within a peripheral vision window of the driver and/or a number of times the object appears within the peripheral vision window of the driver within the given time window. In this regard, the driver gaze capture device 104 may operate on a periodic basis associated with one or more time windows.

Based on the determined driver gaze information associated with the respective training objects, the processor 120 may classify respective training objects. Stated another way, the processor 120 may classify one or more of the training objects as a first class, a second class, a third class, a fourth class, etc. based on the driver gaze location associated with the driver of the vehicle or the driver gaze location information. Explained yet again, this means that the processor 120 may classify the first training object as the first class, classify the second training object as the second class, etc. based on the driver gaze location information. For example, if the driver of the training vehicle stares at one of the training objects for greater than a threshold period of time, that corresponding training object may be classified as the first class, while if the driver of the training vehicle stares at one of the training objects for less than or equal to the threshold period of time, that corresponding training object may be classified as the second class. In this way, the processor 120 may classify respective training objects or bin respective training objects to one or more classes. This may be based on deep neural networks, as will be described herein.

These classes may be indicative of an estimated importance or risk level associated with each one of the training objects. Stated another way, because the driver gaze information is recorded by the driver gaze capture device 104, this driver gaze information may be correlated with respective training objects and this correlation may be utilized, by the processor 120, to accelerate the training of the autonomous vehicle decision making database 172. Explained yet again, by inducing human experience, driver gaze may be utilized as a highly correlated indicia which is associated with driver risk perception against other traffic participants of the operating environment to train the autonomous vehicle decision making database 172. In this way, the object classifier 122 of the processor 120 may classify the respective training objects as different classes based on the driver gaze location information.

According to one aspect, the training objects may be classified into two classes (e.g., the first class and the second class). According to other aspects, the training objects may be classified into more classes, such as three classes, four classes, etc. Regardless, each class may be associated with a risk level or an importance level for corresponding objects associated or assigned to that class. For example, the first class may be a class indicative of risk above a threshold risk level (e.g., a likelihood of collision, likelihood of close encounter, likelihood associated with an evasive maneuver, etc.) while the second class may be a class indicative of risk below the threshold risk level. Further, each class may be associated with a computational cost parameter. For example, objects associated with the first class may be associated with a first computational cost parameter while objects associated with the second class may be associated with a second computational cost parameter. The computational cost parameters will be described in greater detail herein, such as with respect to FIG. 2.

According to one aspect, information from one or more vehicle systems may be received from the CAN bus 150 to further facilitate training of the autonomous vehicle decision making database 172. For example, if braking is detected from the CAN bus 150 while the driver is gazing directly at the training object, this may be taken to be an indicia of importance or risk by the processor 120. Specifically, the processor 120 may classify the first training object as the first class and classify the second training object as the second class based on a vehicle operation input received from the CAN bus 150 of the vehicle. As previously discussed, the vehicle operation input may include a braking action. Other examples of other types of vehicle operation inputs may include a steering action, a swerving action, a lane change signal action, an acceleration action, a deceleration action, a sudden braking action, etc.

According to one aspect, the object classifier 122 of the processor 120 may classify the first training object and/or classify the second training object based on deep neural network machine learning, including using convolutional neural networks (CNN), recurrent neural networks (RNN), etc. In this way, the processor 120 may build an autonomous vehicle decision making database 172 based on the classification of the respective training objects (e.g., the first training object, the second training object, etc.). Thus, the processor 120 may build the autonomous vehicle decision making database 172 based on deep neural network machine learning, the CNNs, and/or the RNNs. The autonomous vehicle decision making database 172, while being built, may be stored on the memory 130 or the storage device 140 of the system 100 for autonomous vehicle decision making. Once the training phase is complete, the communication interface 160 may be utilized to transmit or upload the autonomous vehicle decision making database 172 to the server 170, which may store the autonomous vehicle decision making database 172 therein on a server storage device (not shown).

Operation Phase

Figure 2:
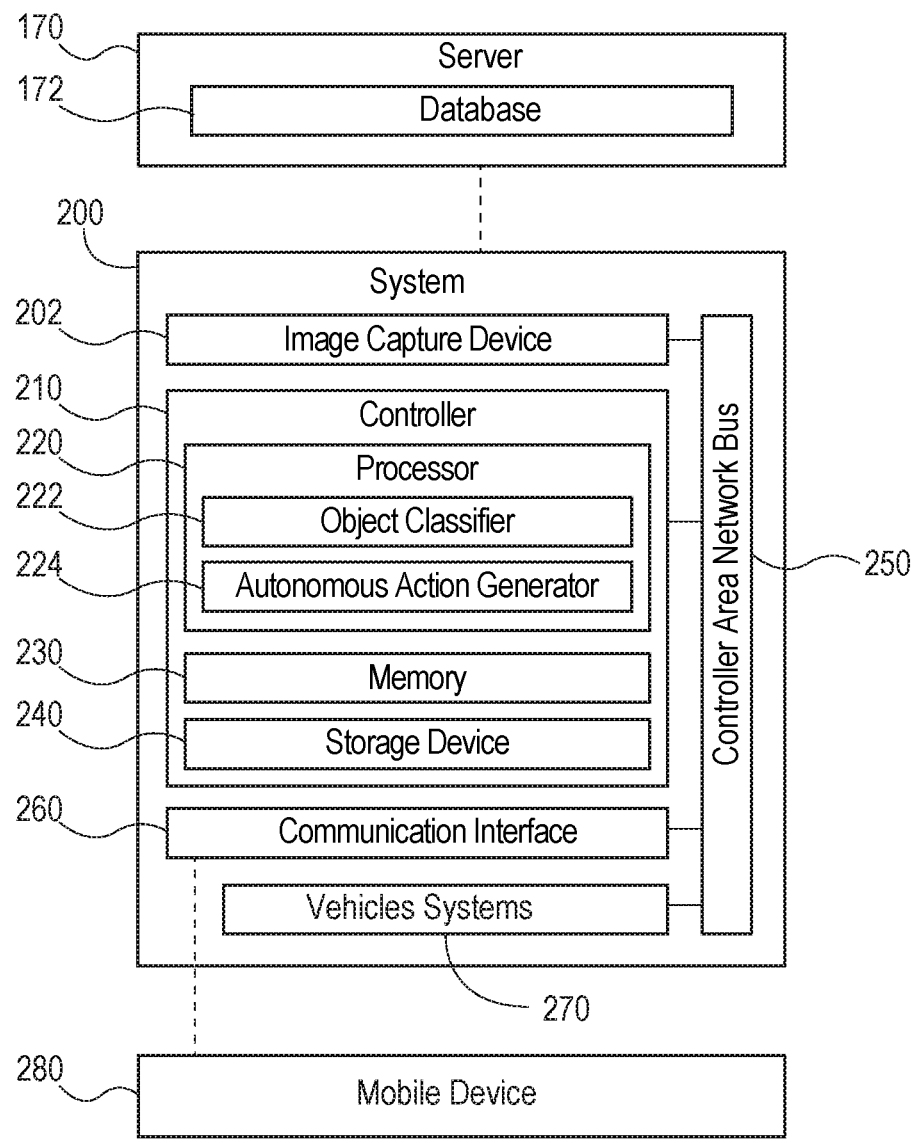
FIG. 2 is an exemplary component diagram of a system for autonomous vehicle decision making, according to one aspect.

FIG. 2 is an exemplary component diagram of a system 200 for autonomous vehicle decision making, according to one aspect. According to one aspect, the system 100 for autonomous vehicle decision making of FIG. 1 may be the same as the system 200 for autonomous vehicle decision making of FIG. 2. For example, the system 200 may include one or more of or all of the components of the system 100 for autonomous vehicle decision making of FIG. 1, including the display 162.

The system 200 for autonomous vehicle decision making of FIG. 2 may receive data from the autonomous vehicle decision making database 172 of the server 170 and utilize this data to classify one or more objects within a real world operating environment during an operational phase. As previously discussed, each object may be classified and associated with the first computational cost parameter or the second computational cost parameter. Objects which are associated with the first computational cost parameter may be granted a greater amount of permissions and/or computing resources, while objects associated with the second computational cost parameter may be granted a lesser amount of permissions and/or computing resources than objects associated with the first computational cost parameter. For example, the objects associated with the first computational cost parameter may perform different types of computations, utilize a greater amount of processing power, storage space, and/or memory use of the system 200 for autonomous vehicle decision making. In this way, the different classes (e.g., associated with the different computational cost parameters) may enable the system 200 for autonomous vehicle decision making to reduce an overall system resource usage because objects which are not as important (e.g., based on the classification to the second class) may not necessarily have their path predictions calculated, for example.

FIG. 2 is an exemplary component diagram of the system 200 for autonomous vehicle decision making, according to one aspect. The system 200 for autonomous vehicle decision making may include an image capture device 202 and a controller 210. The controller 210 may include a processor 220, which may include an object classifier 222 and an autonomous action generator 224. The controller 210 may include a memory 230 and a storage device 240, such as a disk drive or other storage drive. The system 200 for autonomous vehicle decision making may include a CAN bus 250 communicatively coupling and enabling computer communication between respective components of the system 200 for autonomous vehicle decision making. The system 200 for autonomous vehicle decision making may include a communication interface 260 and one or more vehicle systems 270. As previously discussed, the vehicle system 270 may be an autonomous vehicle system for driving the vehicle autonomously. Further, the communication interface 260 may enable the system 200 for autonomous vehicle decision making to perform computer communication between the server 170 and a mobile device 280.

According to one aspect, during the operational mode, the system 200 for autonomous vehicle decision making may receive or capture an image of an operating environment during the operational phase. The image may be of the operating environment through which the vehicle is travelling and may include one or more objects, such as a first object, a second object, a third object, a fourth object, etc.

According to another aspect, the image may be received from the mobile device 280 via the communication interface. According to this aspect, the mobile device may be equipped with its own image capture device, and may be configured to run an 'app' or an application which is supplemental to the system 200 for autonomous vehicle decision making. In any event, the image may be received from another source. Further, the mobile device may be equipped with its own processor and memory, and any operations described herein with respect to the processor 220 may be performed using the processor of the mobile device 280, and the respective results transmitted to the system 200 for autonomous vehicle decision making via the communication interface 260.

Similarly to the processor 120 of FIG. 1, the processor 220 of FIG. 2 may determine, for each one of the objects of the image of the operating environment, whether the corresponding object is or has the potential to be static or dynamic (e.g., mobile or non-mobile, stationary or moving). The processor 220 may discard or ignore static, non-mobile, non-moving, or stationary objects, according to one aspect. In this regard, the processor 220 may extract or identify the first object and the second object from the image of the operating environment based on a movement status of each object. The processor 220 may identify whether each object has the potential to move, even if that object is currently not moving within a current time window. For example, vehicles with zero occupants may be determined to have an extremely low likelihood of moving, while vehicles stopped at a red light or a stop sign may be considered among the dynamic, mobile, or moving class of objects.

According to one aspect, the object classifier 222 of the processor 220 may classify the first object and/or the second object based on deep neural network machine learning, including using convolutional neural networks, recurrent neural networks, and based on the autonomous vehicle decision making database 272, which may be derived or generated based on CNNs, RNN, machine learning, etc. Stated another way, the object classifier 222 of the processor 220 may classify one object (e.g., the first object) as the first class and classify another object (e.g., the second object) as the second class based on data from the autonomous vehicle decision making database. As previously indicated, the autonomous vehicle decision making database may be trained based on classification of the first training object and classification of the second training object according to the driver gaze location and/or the driver gaze location information associated with the driver of the vehicle.

The autonomous action generator 224 of the processor 220 may manage the permissions and resource usage in association with each object of the image of the operating environment, as applicable (e.g., for the objects determined to be mobile, moving, or dynamic). For example, the processor 220 may perform a first computation associated with the first object based on the classification of the first object and the classification of the second object. In other words, because the first object may be associated with the first class and the first computational cost parameter, the second object may be associated with the second class and the second computational cost parameter, and because the first class has greater permissions to use more processing power or computer resources, the first object may be tracked and have path prediction performed by the processor 220, while the second object may merely be tracked by the processor 220.

In this way, the first computational cost parameter of the first class and the second computational cost parameter of the second class may be utilized by the system 200 for autonomous vehicle decision making to mitigate unnecessary use of computing resources, while providing path prediction for objects or obstacles within the operating environment of the corresponding autonomous vehicle. In this way, the operation of the controller 210 and/or the processor 220 of the autonomous vehicle may be enhanced or the performance of the system 200 thereof improved.

According to one aspect, the processor 220 may perform no additional computation associated with the second object based on the classification of the second object as the second class, for example. According to other aspects, the processor 220 may perform a second computation associated with the second object based on the classification of the second object as the second class. As previously discussed, the second computation associated with the second object may be the tracking of the second object and the first computation associated with the first object may be performing, using the processor 220, the path prediction of the first object.

Further, additional objects may be contemplated. For example, when the image includes the third object, the processor 220 may extract the third object from the image of the operating environment, classify the third object based on the autonomous vehicle decision making database (e.g., as the first class, the second class, the third class, etc.). In this example, the processor 220 may perform the second computation associated with the second object based on the classification of the first object, the classification of the second object, and the classification of the third object. Additionally, the processor 220 may perform a third computation associated with the second object based on the classification of the first object, the classification of the second object, and the classification of the third object, etc.

While the processor 220 is tracking one or more of the respective objects, the processor 220 may reclassify objects based on a change associated with the respective objects. For example, the second object may be reclassified as the first class based on data from the autonomous vehicle decision making database and a change in position, a change in velocity, a change in acceleration, etc. associated with the second object. Similarly, the first object may be reclassified as the second class based on data from the autonomous vehicle decision making database and a change in position, a change in velocity, a change in acceleration, etc. associated with the first object. In other words, if a neighboring vehicle slows down and is passed by the autonomous vehicle, path prediction may be ceased in response. As another example, if a neighboring vehicle which was not initially considered a risk or important to path predict begins driving erratically, path prediction may be commenced for that vehicle.

According to one aspect, the system 200 for autonomous vehicle decision making may include the communication interface, which may receive the data associated with the autonomous vehicle decision making database from a server. The communication interface may also receive the image of the image of the operating environment from the mobile device equipped with its own image capture sensor.

Figure 3:
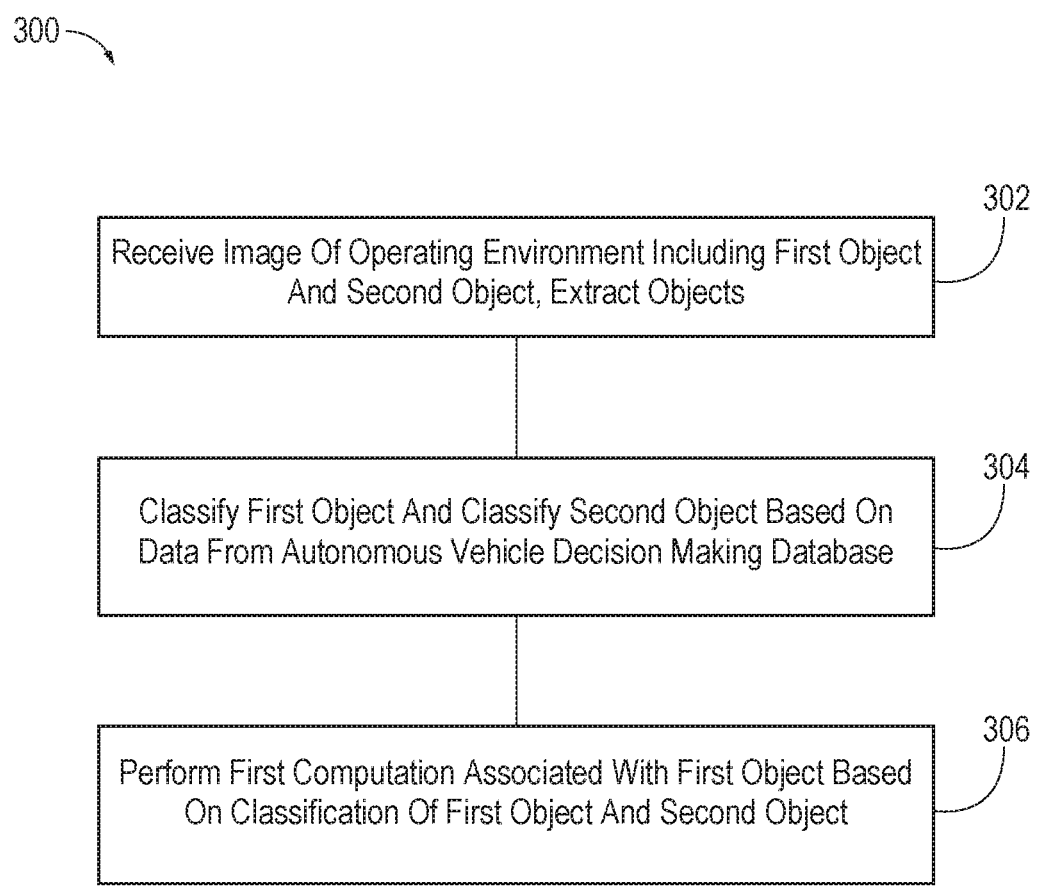
FIG. 3 is an exemplary flow diagram of a method for autonomous vehicle decision making, according to one aspect.

FIG. 3 is an exemplary flow diagram of a method 300 for autonomous vehicle decision making, according to one aspect. The method 300 for autonomous vehicle decision making may include receiving 302 an image of an operating environment through which a vehicle is travelling, wherein the image includes a first object and a second object and extracting the first object and the second object from the image of the operating environment, classifying 304 the first object as a first class, and classifying the second object as a second class based on data from an autonomous vehicle decision making database. The autonomous vehicle decision making database may be trained based on classification of a first training object and classification of a second training object according to a driver gaze location associated with a driver of the vehicle. The method for autonomous vehicle decision making may include performing 306 a first computation associated with the first object based on the classification of the first object and the classification of the second object.

In this way, objects that are detected and associated with different classes may be treated or processed differently by the processor, and processing power or computational resources may be managed or preserved because objects associated with the first class may be assigned tasks or performance which may have permissions to utilize a higher amount of processing power or memory, while objects associated with the second class may be assigned tasks or performance may have less permissions than objects associated with the first class, and may thus utilize a lesser or lower amount of processing power or memory than objects from the first class.

Figure 4:
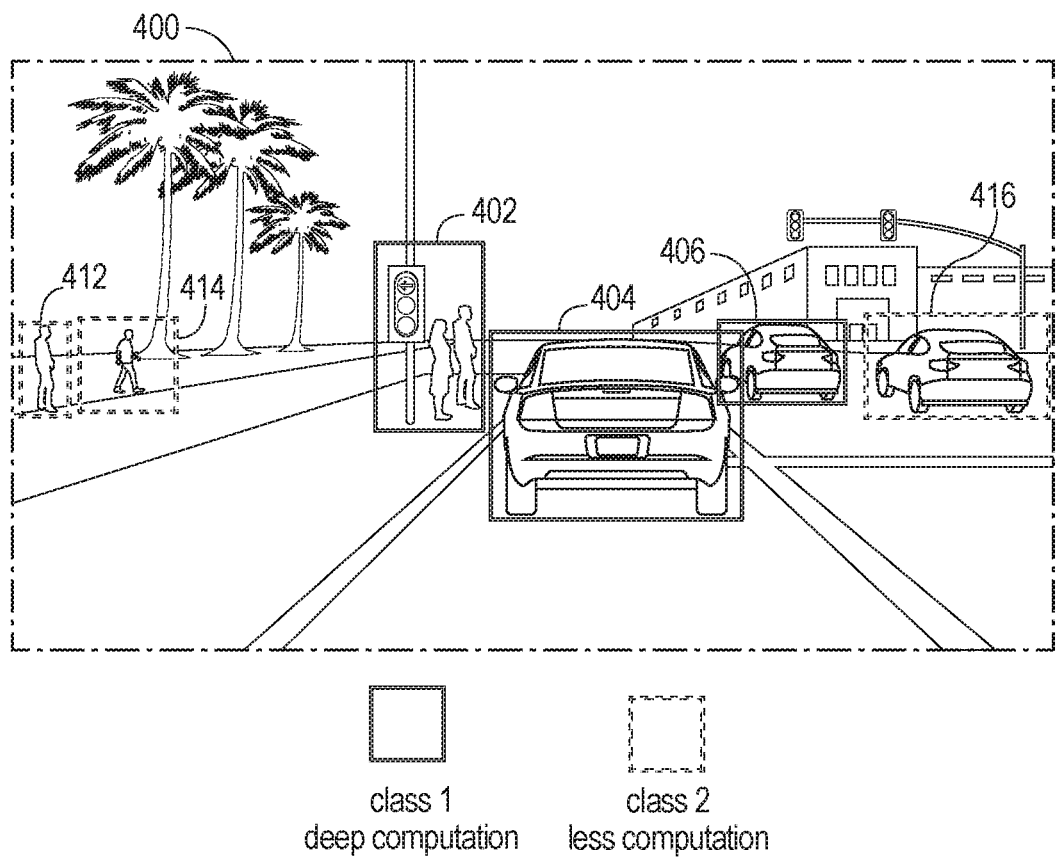
FIG. 4 is an exemplary scenario where the system for autonomous vehicle decision making of FIG. 1 may be implemented, according to one aspect.

FIG. 4 is an exemplary scenario 400 where the system for autonomous vehicle decision making of FIG. 1 may be implemented, according to one aspect. As seen in FIG. 4, objects 402, 404, 406, 412, 414, and 416 have been detected by the image capture device. Based on the data from the autonomous vehicle decision making database, the processor has determined that objects 402, 404, and 406 are classified as the first class, which is associated with a higher importance than objects of the second class. Therefore, the processor may perform path prediction (e.g., deep computation) for objects 402, 404, and 406. Objects 412, 414, and 416, on the other hand, have been classified as the second class. In this regard, the processor may merely perform object tracking (e.g., less computation than path prediction or deep computation tasks) for objects 412, 414, and 416, and not perform any path prediction for respective objects at this time. However, a change in a state for objects 412, 414, and 416 may result in the processor reclassifying one or more of the objects 412, 414, and 416 as the first class, at which time, the processor may implement path prediction calculations for the reclassified objects.

Figure 5:
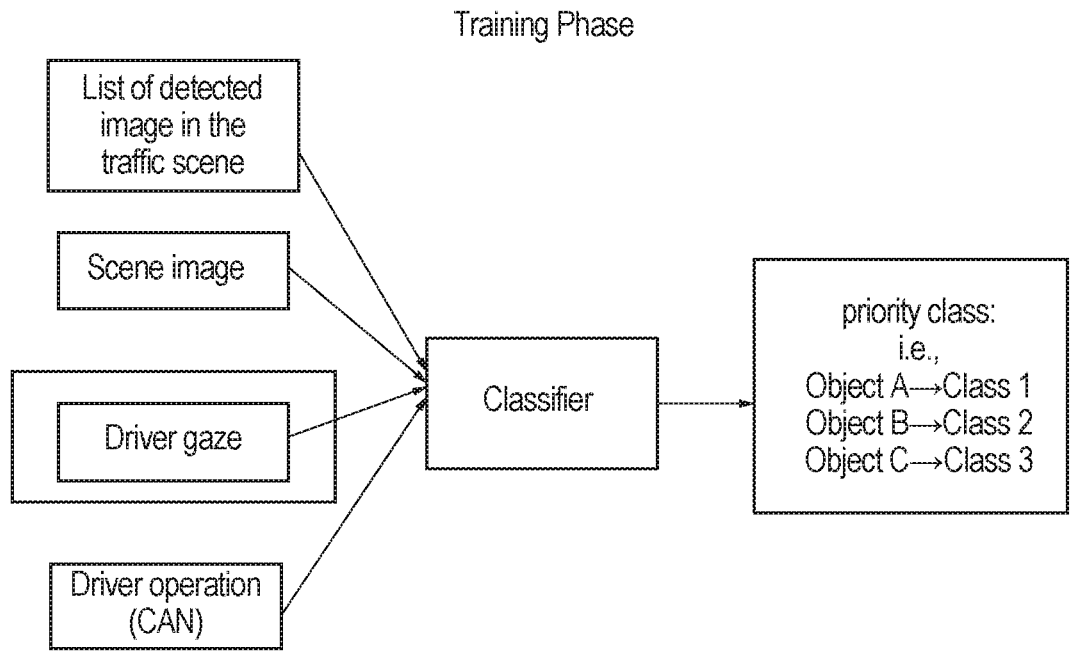
FIG. 5 is an exemplary flow diagram of a method for autonomous vehicle decision making, according to one aspect.
Figure 6:
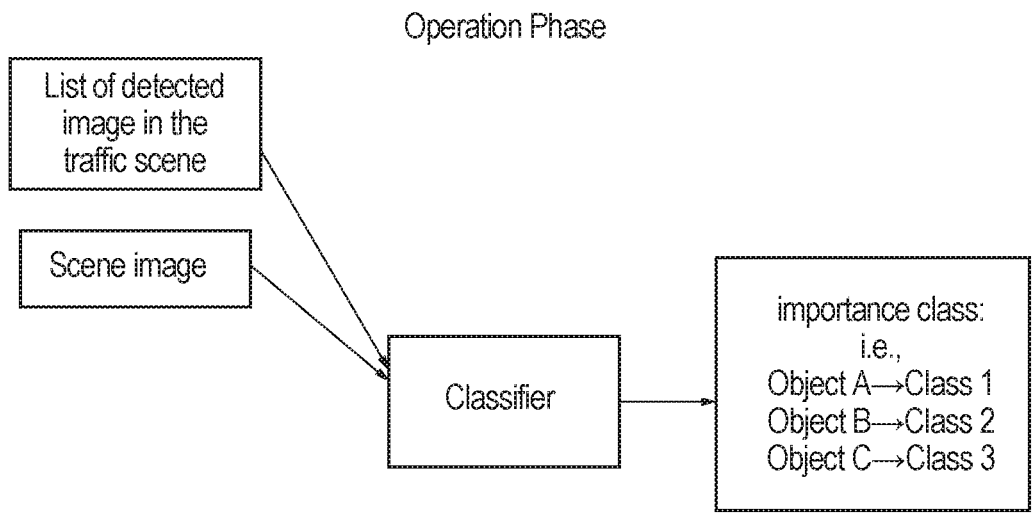
FIG. 6 is an exemplary flow diagram of a method for autonomous vehicle decision making, according to one aspect.

FIGS. 5-6 are exemplary flow diagrams of a method for autonomous vehicle decision making, according to one aspect. FIG. 5 is an exemplary flow diagram of a method for autonomous vehicle decision making according to the training phase where an input image, driver gaze, and CAN bus inputs are considered, while FIG. 6 is an exemplary flow diagram of a method for autonomous vehicle decision making, according to the operation phase. The classifier of FIG. 6 may operate based on data from the autonomous vehicle decision making database, where merely the input image is considered, as described in FIG. 1.

Figure 7:
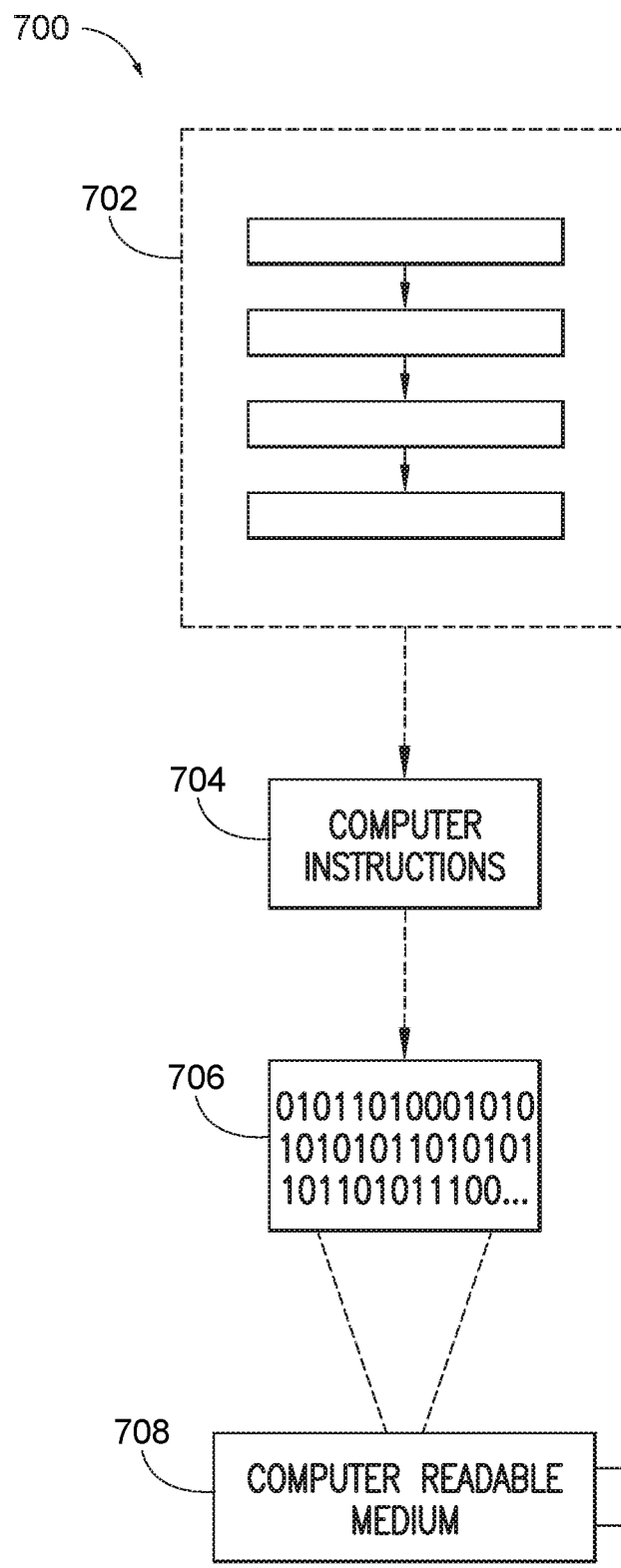
FIG. 7 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 7, wherein an implementation 700 includes a computer-readable medium 708, such as a CD-R, DVD-R, flash drive, a platter of a hard disk drive, etc., on which is encoded computer-readable data 706. This encoded computer-readable data 706, such as binary data including a plurality of zero's and one's as shown in 706, in turn includes a set of processor-executable computer instructions 704 configured to operate according to one or more of the principles set forth herein. In this implementation 700, the processor-executable computer instructions 704 may be configured to perform a method 702, such as the method 300 of FIG. 3, the method 500 of FIG. 5, or the method 600 of FIG. 6. In another aspect, the processor-executable computer instructions 704 may be configured to implement a system, such as the system 100 of FIG. 1 or the system 200 of FIG. 2, which may be the same system according to some aspects. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 8:
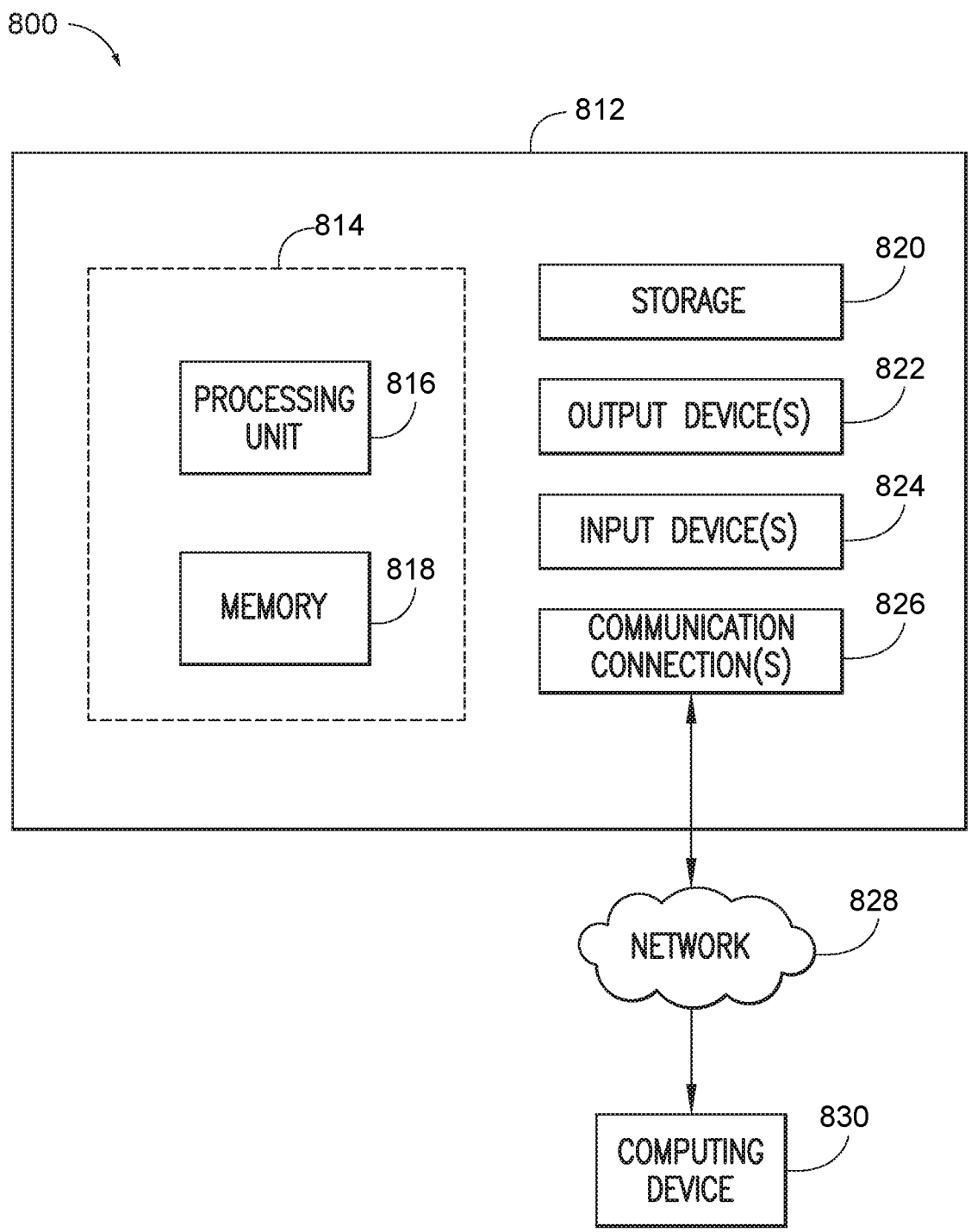
FIG. 8 is an illustration of an example computing environment where one or more of the provisions set forth herein are implemented, according to one aspect.

FIG. 8 and the following discussion provide a description of a suitable computing environment to implement aspects of one or more of the provisions set forth herein. The operating environment of FIG. 8 is merely one example of a suitable operating environment and is not intended to suggest any limitation as to the scope of use or functionality of the operating environment. Example computing devices include, but are not limited to, personal computers, server computers, handheld or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 8 illustrates a system 800 including a computing device 812 configured to implement one aspect provided herein. In one configuration, the computing device 812 includes at least one processing unit 816 and memory 818.

Depending on the exact configuration and type of computing device, memory 818 may be volatile, such as RAM, non-volatile, such as ROM, flash memory, etc., or a combination of the two. This configuration is illustrated in FIG. 8 by dashed line 814.

In other aspects, the computing device 812 includes additional features or functionality. For example, the computing device 812 may include additional storage such as removable storage or non-removable storage, including, but not limited to, magnetic storage, optical storage, etc. Such additional storage is illustrated in FIG. 8 by storage 820. In one aspect, computer readable instructions to implement one aspect provided herein are in storage 820. Storage 820 may store other computer readable instructions to implement an operating system, an application program, etc. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the computing device 812. Any such computer storage media is part of the computing device 812.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The computing device 812 includes input device(s) 824 such as keyboard, mouse, pen, voice input device, touch input device, infrared cameras, video input devices, or any other input device. Output device(s) 822 such as one or more displays, speakers, printers, or any other output device may be included with the computing device 812. Input device(s) 824 and output device(s) 822 may be connected to the computing device 812 via a wired connection, wireless connection, or any combination thereof. In one aspect, an input device or an output device from another computing device may be used as input device(s) 824 or output device(s) 822 for the computing device 812. The computing device 812 may include communication connection(s) 826 to facilitate communications with one or more other devices 830, such as through network 828, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for autonomous vehicle decision making, comprising:
   an image capture device capturing an image of an operating environment through which a vehicle is travelling, wherein the image includes a first training object and a second training object;
   a driver gaze capture device capturing a driver gaze location associated with a driver of the vehicle; and
   a processor:
   extracting the first training object and the second training object from the image of the operating environment;
   classifying the first training object as a first class and classifying the second training object as a second class based on the driver gaze location associated with the driver of the vehicle;
   building an autonomous vehicle decision making database based on the classification of the first training object and the classification of the second training object; and
   operating an autonomous vehicle autonomously based on data from the autonomous vehicle decision making database.

2. The system for autonomous vehicle decision making of claim 1, wherein the processor classifies the first training object as the first class and classifies the second training object as the second class based on a vehicle operation input received from a controller network area (CAN) bus of the vehicle.

3. The system for autonomous vehicle decision making of claim 1, wherein the processor classifies the first training object as the first class and classifies the second training object as the second class based on deep neural network machine learning.

4. The system for autonomous vehicle decision making of claim 1, wherein the processor builds the autonomous vehicle decision making database based on deep neural network machine learning.

5. A system for autonomous vehicle decision making, comprising:
   an image capture device capturing an image of an operating environment through which a vehicle is travelling, wherein the image includes a first object and a second object; and
   a processor:
   extracting the first object and the second object from the image of the operating environment;
   classifying the first object as a first class and classifying the second object as a second class based on data from an autonomous vehicle decision making database,
   wherein the autonomous vehicle decision making database is trained based on classification of a first training object and classification of a second training object according to a driver gaze location associated with a driver of the vehicle;
   performing a first computation associated with the first object based on the classification of the first object and the classification of the second object; and
   operating an autonomous vehicle autonomously based on data from the autonomous vehicle decision making database.

6. The system for autonomous vehicle decision making of claim 5, wherein the processor performs no computation associated with the second object based on the classification of the first object and the classification of the second object.

7. The system for autonomous vehicle decision making of claim 5, wherein the processor performs a second computation associated with the second object based on the classification of the first object and the classification of the second object.

8. The system for autonomous vehicle decision making of claim 7, wherein the second computation associated with the second object is tracking of the second object.

9. The system for autonomous vehicle decision making of claim 5, wherein the first computation associated with the first object is path prediction of the first object.

10. The system for autonomous vehicle decision making of claim 5, wherein the image includes a third object, the processor extracts the third object from the image of the operating environment, classifies the third object as a third class based on the autonomous vehicle decision making database.

11. The system for autonomous vehicle decision making of claim 10, wherein:
   the processor performs a second computation associated with the second object based on the classification of the first object, the classification of the second object, and the classification of the third object; and
   the processor performs a third computation associated with the second object based on the classification of the first object, the classification of the second object, and the classification of the third object.

12. The system for autonomous vehicle decision making of claim 5, wherein the processor reclassifies the second object as the first class based on data from the autonomous vehicle decision making database and a change associated with the second object.

13. The system for autonomous vehicle decision making of claim 5, comprising a communication interface receiving the data associated with the autonomous vehicle decision making database from a server.

14. The system for autonomous vehicle decision making of claim 5, comprising a communication interface receiving the image of the image of the operating environment from a mobile device equipped with an image capture sensor.

15. A method for autonomous vehicle decision making, comprising:
   receiving an image of an operating environment through which a vehicle is travelling, wherein the image includes a first object and a second object;
   extracting the first object and the second object from the image of the operating environment;
   classifying the first object as a first class and classifying the second object as a second class based on data from an autonomous vehicle decision making database,
   wherein the autonomous vehicle decision making database is trained based on classification of a first training object and classification of a second training object according to a driver gaze location associated with a driver of the vehicle;
   performing a first computation associated with the first object based on the classification of the first object and the classification of the second object; and
   operating an autonomous vehicle autonomously based on data from the autonomous vehicle decision making database.

16. The method for autonomous vehicle decision making of claim 15, comprising performing no computation associated with the second object based on the classification of the first object and the classification of the second object.

17. The method for autonomous vehicle decision making of claim 15, comprising performing a second computation associated with the second object based on the classification of the first object and the classification of the second object.

18. The method for autonomous vehicle decision making of claim 15, wherein the second computation associated with the second object is tracking of the second object.

19. The method for autonomous vehicle decision making of claim 15, wherein the first computation associated with the first object is path prediction of the first object.

20. The method for autonomous vehicle decision making of claim 15, comprising classifying the second object as the first class based on data from the autonomous vehicle decision making database and a change associated with the second object.

* * * * *